J. W. CAMPBELL.
VARIABLE SPEED GEARING.
APPLICATION FILED AUG. 24, 1915.

1,182,752. Patented May 9, 1916.
3 SHEETS—SHEET 1.

WITNESSES:

INVENTOR
JAMES W. CAMPBELL,
BY Munn & Co.
ATTORNEYS

UNITED STATES PATENT OFFICE.

JAMES W. CAMPBELL, OF RENO, NEVADA.

VARIABLE-SPEED GEARING.

1,182,752.  Specification of Letters Patent.  Patented May 9, 1916.

Application filed August 24, 1915. Serial No. 47,178.

*To all whom it may concern:*

Be it known that I, JAMES W. CAMPBELL, a citizen of the United States, and a resident of Reno, in the county of Washoe and State of Nevada, have invented a new and useful Improvement in Variable - Speed Gearing, of which the following is a specification.

My invention is an improvement in variable speed gearing, and is an improvement over my prior application, Serial No. 14,048, filed March 13, 1915, and the present invention has for its object to provide a gearing of the character specified, wherein the driving shaft and the driven shaft are arranged to be connected directly or at varying speeds through the intermediary of a counter shaft, and wherein a common means is provided for controlling the direct connection and the connection between the counter shaft and the driven shaft in alternation in such manner that the driving and the driven shafts may not be connected directly without releasing the driven shaft from the counter shaft.

A further object is to provide a reversing gear connection between the driving shaft and the driven shaft, wherein an idler is provided for connecting the driving shaft with the counter shaft, the idler, the gear of the driving shaft and the gear of the counter shaft being normally out of register, and wherein a common means is provided for first moving the idler to a half engagement with the gear of the countershaft and to full engagement with the gear of the driving shaft, and to afterward move the two gears into register with the gear of the counter shaft.

A further object is to provide mechanism for operating the several connections, wherein the connections are operated by sliding members or bars, and the bars are moved by cam plates movable transversely of the bars to move them in opposite directions.

In the present embodiment of the invention a casing 1 is provided, having an internally threaded opening 2 in its bottom and at the lowest point, and a plug 3 is threaded into the opening for normally closing the same. The casing is closed by a cover 4, which is secured to a marginal flange 5 on the casing by means of bolts 6. The casing is provided in one end and near its top with a bearing 7, and a bushing 8 is arranged in the bearing, the bushing having a marginal flange at its inner end which fits a counterbore in the inner face of the casing. The driven shaft 9 is journaled in this bushing, and the driving shaft 10 is journaled in a similar bushing 11, held in a separable bearing 12, which is secured to the adjacent end of the casing by means of bolts 13. The inner end of the driven shaft is provided with a socket 14, and the inner end of the driving shaft 11 is journaled in the socket. That portion of the driving shaft which is received in the socket is cylindrical, but the driving shaft is provided with a polygonal portion 15 between the socket and the body of the shaft.

A countershaft 16 is journaled in bearing lugs 17 within the casing below the alined driving and driven shafts, and an idler shaft 18 is also journaled in the casing in bearing lugs 19. A sleeve 20 is journaled on the driving shaft, and a clutch section 21 is pinned to the driving shaft at the end adjacent to the bearing 12, and this clutch section is adapted to engage a similar clutch section on the adjacent end of the sleeve 20 on the adjacent end of a second sleeve 22, or on the adjacent end of a third sleeve 23.

The sleeves 20, 22 and 23 are arranged coaxial one upon the other, and the said sleeves are merely the elongated hubs of gear wheels 24, 25 and 26, respectively, the gear wheel 24 being the reverse gear, the gear wheel 25 the low speed, and the gear wheel 26 the intermediate speed. These sleeves or gear wheels are movable independently of each other, so that any one of the three may be brought into engagement with the clutch section 21 and this clutch section is of such size that it may engage any one of the three sleeves or gear wheels. Another gear wheel 27 is journaled on the socket 14 of the driven shaft, and this gear wheel has clutch teeth on its inner face or on the hub thereof, which are adapted to be engaged by similar teeth on a clutch section 28. This section 28 is feathered on the socket, and it may be engaged with the gear wheel 27 or with a fixed clutch section 29, which is arranged on the polygonal portion 15 of the driving shaft, thus connecting the driving shaft directly with the driven shaft.

The gear wheels 25 and 26 are adapted to mesh with gear wheels 31 and 32, respectively, keyed on the counter shaft 16, and the gear wheel 27 meshes with a similar gear 33, also keyed on the counter shaft 16. When the clutch section 28 is in the position of Fig. 1, that is, in a position to connect the gear wheel 27 with the driven shaft, either of the gear wheels 25 or 26 may be moved into engagement with the fixed clutch section 21 on the driving shaft, and when the said gear wheel is moved into engagement with the fixed clutch section 21 it will be at the same time moved into register with the gear wheel 31 or 32, as the case may be, on the counter shaft to drive the driven shaft at low or intermediate speed.

The gear wheel 24 meshes with a gear wheel 34 on the idler shaft 18, and this gear wheel 34, which is movable longitudinally of the idler shaft is adapted to mesh with a gear wheel 30, also keyed to the counter shaft 16, under conditions to be presently described. With the clutch section 28 in the position of Fig. 1, and with the gear wheels 24, 25 and 26 also in the position shown, when the gear wheel 24 and its elongated hub 20 are moved into engagement with the clutch section 21 on the driving shaft, the gear wheel 34 will drive the gear wheel 30, and the gear wheel 33 will drive the gear wheel 27 in the reverse motion. By moving the clutch section 28 into engagement with the section 29, the driving shaft and the driven shaft may be connected directly. Each of the hubs or sleeves 20, 22 and 23 is provided with an annular groove, and each groove is engaged by the arms of a fork on a sliding member mounted adjacent to the sleeve or hub. The clutch section 28 is provided with a similar groove for a similar purpose.

A lever 35 is pivoted to the wall of the casing, near the inner end of the idler shaft 18, the said lever being pivoted to a pin 36, extending inwardly from the casing wall. An arm 37 is pivoted to the upper end of the lever, the said arm having an angular portion connected to the lever and a curved or arc-shaped portion 37ª, which engages over the sleeve 20 in the annular groove.

It will be evident that when the lever 35 is swung with its upper end moving away from the driven shaft, the sleeve 20 will be moved toward the clutch section 21. This annular groove however, is of suitable length, so that the arc-shaped portion 37ª of the arm may be moved some little distance before the sleeve 20 begins to move therewith. The arm 37 in addition to the arc-shaped portion 37ª has another arc-shaped portion 37ᵇ, which engages an annular groove 38, in the hub of the gear wheel 34. When the upper end of the lever 35 is moved away from the idler shaft the first movement of the lever moves the idler 34 into engagement or mesh with the gear wheel 30 over half the width of its face, and into full engagement with the gear wheel 24, and the yoke or portion 37ª of the arm engages the end of the annular groove adjacent to the sleeve 22. Now a further movement of the lever 35 moves both the gear 24 and the gear 34 toward the gear wheel 30, until the three gear wheels are in register, in other words, the connection between the arm and the sleeve 20 is a lost motion connection.

Sliding members are provided for moving the lever 35, for moving the gear wheel 25, for moving the gear wheel 26, and for operating the clutch member 28. The sliding member 39 which is provided for moving the lever 35 has at one end a laterally offset portion 39ª, which is pivoted to the lever 35, intermediate its ends. The other end of the sliding member or bar 39 is received in a guide 40 in the casing, and this bar or sliding member has a vertical opening 41, through which extends a cam lever to be later described. The sliding member 42 for the gear wheel 26 has a fork, and the arms 43 of the fork engage the annular groove of the sleeve 23. The sliding member 44 for the gear wheel 25 has a fork whose arms 45 engage the annular groove of the sleeve 22. This sliding member 44 is on the opposite side of the casing 1 from the sliding member 42. The sliding member or bar 46, which moves the clutch member 28, has an angular portion 47, which is connected by means of a link 48 with a lever 49. This lever is pivoted to a lug 50 on the casing at one end, and the other end engages the annular groove of the clutch section 28.

When the sliding member or bar 46 is moved away from the gear wheel 27 the inner end of the lever 49 will be swung in a direction to move the clutch section 28 toward the fixed section 29, while when the sliding member or bar is moved toward the gear wheel 27 the clutch section 28 will be moved toward the gear wheel 27. All of these sliding members or bars 39, 42, 44 and 46 are similar in one respect, in that each has an opening 41, and each is guided by a guide 40 in the casing. Each of the said sliding members or bars is moved by a cam of the character shown in Fig. 4. This cam comprises a vertically movable plate or bar 51, which is mounted to slide in a guide 52 at its lower end on the casing and through an opening 53 in the top of the casing. Each of the cams has a laterally offset portion 51$^a$ intermediate its ends, and this laterally offset portion is connected to the ends of the cam by inclined portions 51$^b$.

Balls 54 are arranged within the openings 41 on opposite sides of the cam lever, the said balls contacting with the opposite edges of the cam. Each cam has a stop 55 at its outer edge for engaging the adjacent bar or sliding member to limit the downward movement of the cam. Each cam has a head 56 outside of the casing for engagement by a lever 57 or the like, for moving the cam.

Figure 1:
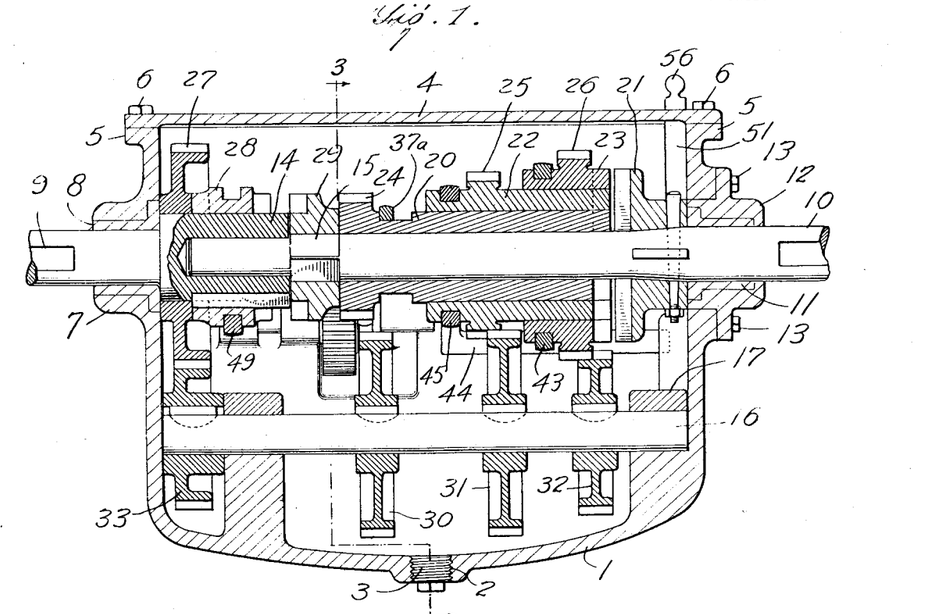
—Figure 1 is a longitudinal vertical section through the gearing.
Figure 2:
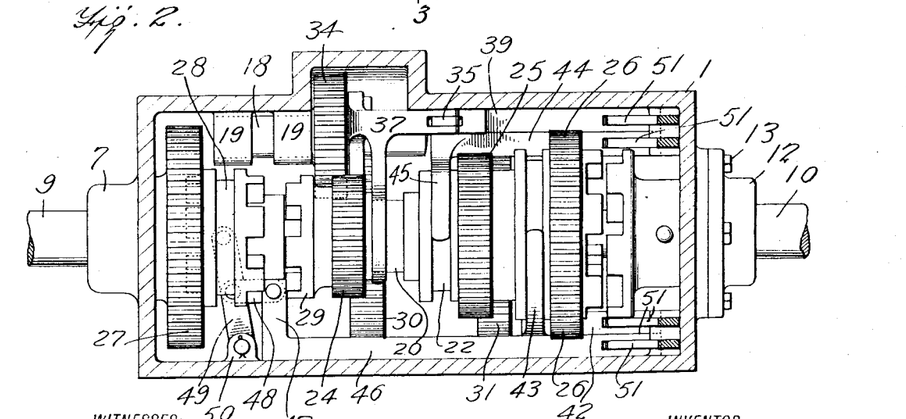
Fig. 2 is a section on the line 2—2 of Fig. 3.

It will be evident that when either of the four cams is lifted in the position shown in Fig. 1, the gear wheel connected therewith will be moved in one direction while when the cam is depressed, the sliding member connected therewith will be moved in the opposite direction to move the gear wheel connected with the sliding member in the same direction. The gear wheels 25 and 26 are in mesh with the gear wheels 31 and 32 when the clutch section 21 is disengaged from the said gear wheels 25 and 26.

It will be evident from the description that all of the shifting members are on the driving, the driven and the idler shafts, and that none are on the counter shaft, all of the gear wheels being rigidly keyed to the countershaft. No levers are used to operate the sliding bars, but instead longitudinally movable push members are provided. Since these members are merely moved vertically and do not require to be swung but little room is required.

One of the balls 54 is seated in a recess in the inner end of the opening 41, while the other is inserted from the outer end of the sliding member, and the ball is held in place by a screw 58. Any suitable operating means may be connected with the heads 56 of the several cams 51 to operate the said cams. When it is desired to connect the driving shaft and the driven shaft on the reverse speed, the gear wheel 28 is left in the position shown in Fig. 1.

Figures 3, 4, 5:
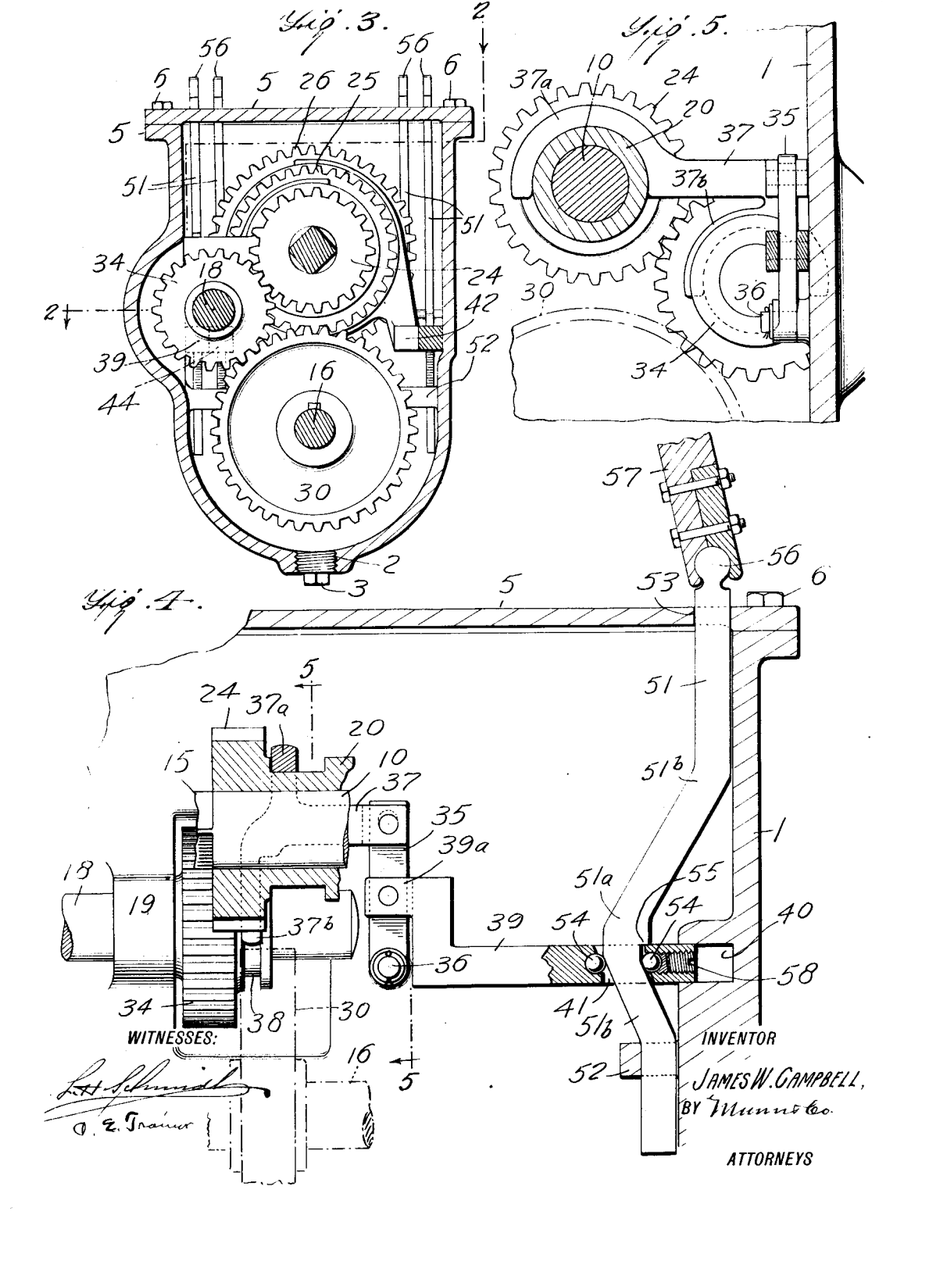
Fig. 3 is a section on the line 3—3 of Fig. 1, both views (Figs. 2 and 3) looking in the direction of the arrows adjacent to the line.
Fig. 4 is an enlarged detail section of a portion of the gearing.
Fig. 5 is a section on the line 5—5 of Fig. 4, looking in the direction of the arrows adjacent to the line.

The normal position of the cam 51 is shown in Fig. 4, and with the cams in this position the gears are in neutral position. That cam 51 pertaining to the sliding member 34 will be lifted by mechanism to be presently described, and the sliding member 39 pertaining to that cam 51, which is lifted, will be moved outward, swinging the upper end of the lever 35 away from the idler shaft 18. The first movement of the lever 35, as before stated, moves the gear wheel 34 into mesh with the gear wheel 30, and a continuation of the movement moves the gear wheels 24, 34 and 30 into registration, and the driving shaft now driving the driven shaft in the opposite direction.

When it is desired to connect on the forward low speed, it is the slide 44 that is moved by lifting the cam 51 belonging thereto. This moves the sleeve 22 toward the fixed clutch section 21 connecting the said sleeve to the fixed clutch section and bringing the gear wheel 25 into register with the gear wheel 31. The clutch section 28 is still in the position of Fig. 1, this being the normal position of the said clutch section. When it is desired to connect the shafts on the intermediate speed the slide 42 is moved, clutching the section 23 to the fixed clutch section 21 and bringing the gear wheel 26 into register with the gear wheel 32.

When it is desired to connect the shafts 9 and 10 directly the slide 46 is operated to move the clutch section 28 out of engagement with the gear wheel 27 and into engagement with the fixed section 29. The shafts 9 and 10 are now connected directly.

It will be evident from the description that the driving and the driven shafts may not be connected directly without first releasing any other connection that may be at that time operative. For instance, should the driver attempt to connect the driving shaft with the driven shaft directly, with the gear 26 in mesh with the gear 32 the first movement of the clutch section 28, would release the counter shaft from the driven shaft, thus breaking the connection between the counter shaft and the driven shaft, and this applies to any other indirect connection.

The gear wheels 25, 31 and 26, 32 are always in mesh. Similarly the gear wheels 24 and 34 are always in mesh, and the gear wheel 34 is meshed with the gear wheel 30 before the gear wheel 24 is connected to the fixed clutch 21. When gear wheel 36 is engaged with the clutch section 21, power is transmitted from the shaft 10 through the gears 26 and 32 to the shaft 16. Since gear wheel 31 is in mesh with gear wheel 25 at this time, the gear wheel 25 will be rotated forwardly at its fixed speed ratio, and because of this the clutch engagement from 26 to 25 may be made without shock or jar.

The operating mechanism shown in Figs. 6 to 11, comprises a casing consisting of upper and lower sections 60 and 61, respectively, the sections having radial flanges 62 and 63, respectively, which lap upon each other, and the flanges are secured together by means of screws 64 or the like. This casing 60—61 is secured to the seat 65 at one end thereof in convenient position for the operator or driver, and within the casing is arranged a series of disks 65, the said disks fitting the casing and being rotatable therein, and a series of ball bearings 66 is arranged within a recess of the casing beneath each disk, for supporting the same and reducing friction.

Each disk is recessed in the plane of the disk for approximately half its diameter, and on the under side as indicated at 66, and the links 57 before mentioned, are connected to the respective disks, the upper ends of the links being received within the recesses 66 of the respective disks, and each link 57 is pivoted to the disk by a screw 67, which is passed through the disk and the link, the head of the screw being counter sunk as shown.

The upper section 60 of the casing has a circumferential slot 68, at each of the disks, and a headed pin 69 passes through each of these slots into engagement with the adjacent disk. It will be noticed from an inspection of Fig. 6, that the inner end of each of these pins is threaded to engage a similar opening in the disk.

A sleeve 70 is mounted to slide on each of the pins, and each sleeve has a finger piece 71 at its front for engagement by the finger of the operator to permit the sleeve to be lifted. A coil spring 72 is arranged within the bore of each sleeve between the inner end thereof and the inner end of the head of the pin, and these springs normally press the sleeves toward the casing.

Figures 6, 7, 8, 10:
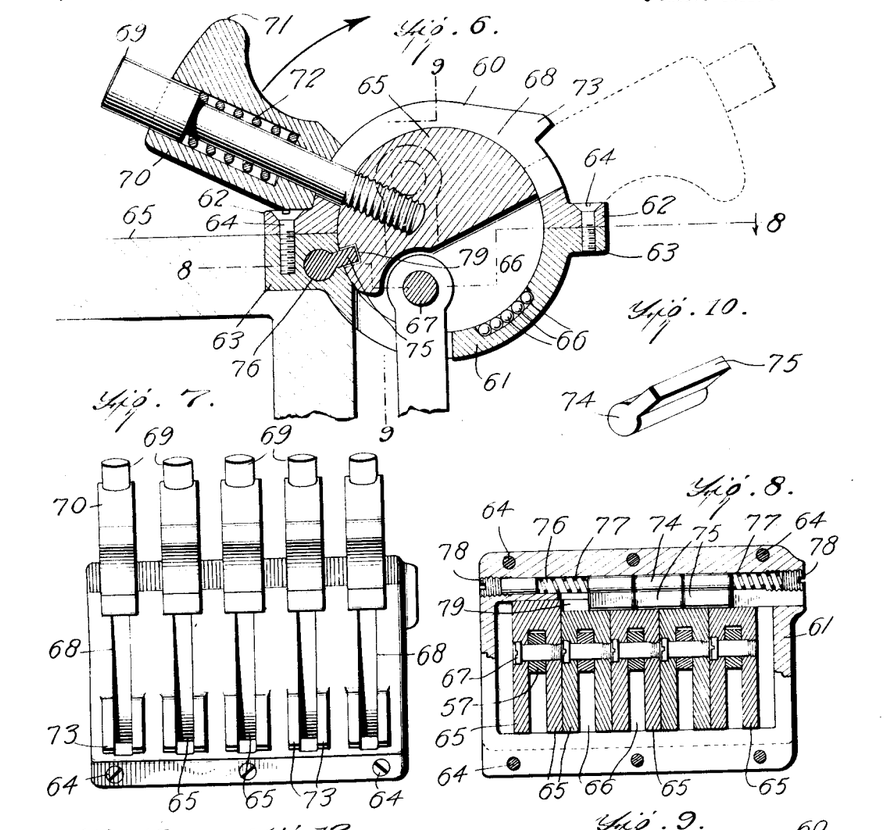
Fig. 6 is a sectional view of the operating mechanism.
Fig. 7 is a top plan view of the said mechanism.
Figs. 8 and 9 are sections on the lines 8—8 and 9—9, respectively, of Fig. 6, Fig. 8 looking in the direction of the arrows adjacent to the line.
Fig. 10 is a perspective view of one of the locking elements.
Figure 9:
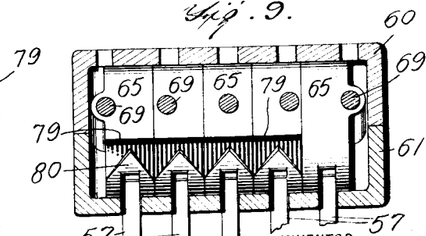
Figure 11:
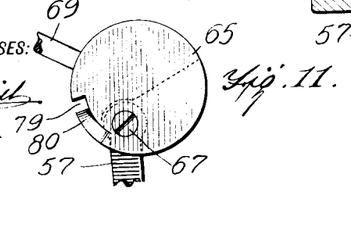
Fig. 11 is an end view of one of the disks.

It will be obvious that when any pin is moved, as indicated in dotted lines in Fig. 6, through the slot 68 the disk to which the pin is connected will be rotated within the casing, riding on the balls 66 which support the disk, and the link 57 connected to the disk will be lifted to lift the cam 51 connected with the link 57. This upward movement of the cam will cause the sliding member, pertaining to the cam to move outward, the ball 54 rolling over the inclined face of the portion 51$^b$ of the cam.

Locking lugs 73 are provided on the section 60 of the casing at the forward end of each of the slots 68, for engagement by the sleeve 70 to lock the headed pin and the disk pertaining thereto in its forward position, that is, in a position such that the cam 51 pertaining to the disk is in upward position. When the cams are depressed as shown in Fig. 4, that is, when they are in normal position, the shoulders 55 of the cams rest upon the upper faces of the sliding members, locking the parts in neutral position.

Releasable locking mechanism is provided for preventing the movement of but a single disk, that is, to restrain all of the remaining disks from rotating when one disk is rotated. This mechanism comprises a series of locking bolts, each having a rounded portion 74 and a wing or vane 75. The rounded portions of the locking bolts are arranged within a cylindrical opening 76, extending longitudinally of the section 61 of the casing, within the wall thereof, and the wings or vanes 75 of the locking bolts extend into the interior of the casing 60—61. This opening 76 extends to the ends of the section 61, and coil springs 77 are arranged within the opening 76 at the opposite ends of the series of locking bolts. The springs force the locking bolts toward each other, and threaded plugs 78 are threaded into the ends of the openings to prevent disengagement of the springs and to make counter-pressure against the outer ends of the springs. The portion 74 of each locking bolt extends, as before stated, into the interior of the casing and into engagement with radial slots 79 in the respective disks.

Figures 12, 13:
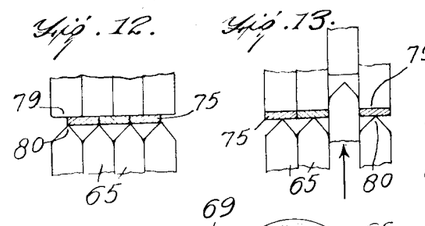
Figs. 12 and 13 are diagrammatic plan views showing the movement of the locking elements.

With the five disks shown, three locking bolts are provided, and mechanism is provided on each disk for spreading the bolts to free the particular disk being turned. Just in rear of the radial recess 79 before mentioned, each of the disks 65 has a cam-shaped member 80, formed by cutting away the periphery of the disk at the rear wall of the notch or recess 79 at each side. This forms a pointed member shown in Figs. 9, 11, 12 and 13, which will engage between the wings or vanes of adjacent bolts, and will move the said bolts longitudinally of the recess 79, against the resistance of the springs. The three locking bolts shown, are normally held by the springs in the position of Fig. 12, that is, in such position that they will form a lock against the turning movement of the five disks, until one of the disks is turned. The points of the cams 80 are at the junction or abutting line of the three locking bolts, as shown in Fig. 12, when the said bolts are in normal position. When the disk is rotated as shown in Fig. 13, the cam 80 of the disk will move between the adjacent locking bolts and will force the locking bolts at each side laterally and directly into the path of movement of the pointed members 80 of the remaining disks, thus positively locking every disk against movement except the disk being moved, and the remaining disks cannot be moved until the disk which has been moved is returned to normal position. Thus the locking mechanism provides a positive lock against moving any disk, that is, against actuating any gear connection until all of the remaining connections are in normal position. After the gear connection is made for instance, on the low speed, this connection must be broken before another connection can be made. There is no possibility of making another connection until the connection in being has been broken.

In the operation of the above-described mechanism, when it is desired to connect the driving shaft with the driven shaft on the low speed for instance, that headed pin 69 pertaining to the low speed will be moved forwardly as indicated by the large arrow in Fig. 6 into the dotted line position of the said figure. The sleeve 70 will slip down behind the stop plug 73, and will lock the disk in this position. As the disk is rotated, the cam 80 thereof will move between two locking bolts, and will move the bolts laterally as shown in Fig. 13, against the resistance of the springs 77 and will positively lock every other disk except the one being turned. As the disk is rotated the link 57 will be lifted and the cam 51 pertaining thereto, will be lifted, thus moving the sliding member 44 in a direction to move the gear wheel 25 toward the fixed clutch section 21.

It will be understood that in practice the sleeves of the headed pins will be marked with the speed either reverse, low, intermediate or high, as the case may be, so that the driver may be able to determine at a glance which speed he is operating.

I claim:—

1. A variable speed gearing, comprising alined driving and driven shafts, a plurality of fixed clutch sections on the driving shaft and spaced apart from each other, a series of concentric gear wheels adjacent to one of the clutch sections and movable independently of each other toward and from the adjacent fixed clutch section, a gear wheel on the driven shaft, a clutch section feathered on the driven shaft and movable between the other fixed clutch section and the gear wheel to alternately connect the driving and the driven shafts to direct or to connect the gear wheel with the driven shaft, a counter shaft journaled parallel with the shafts, a fixed gear on the counter shaft meshing with the gear on the driven shaft, a fixed gear on the counter shaft for each of the gears of the series on the driving shaft, each gear of the series being moved into register with the corresponding gear of the counter shaft when the said gear is moved into engagement with the fixed clutch section, an idler gear for connecting one of the gears of the series to the adjacent gear on the counter shaft, the other gears of the series meshing directly with the gears of the counter shaft, means for moving each of the last-named gears of the series, means for moving the clutch section on the driven shaft, and a common means for moving the idler into register and into mesh with the adjacent gear on the counter shaft and for moving the gear of the series adjacent thereto into engagement with the fixed clutch section and into register with the gear on the counter shaft, said means having a lost motion connection with the gear of the series to move the idler into mesh with the gear of the counter shaft before the idler and the gear are moved into register with the said gear.

2. A variable speed gearing, comprising alined driving and driven shafts, a plurality of fixed clutch sections on the driving shaft and spaced apart from each other, a series of concentric gear wheels adjacent to one of the clutch sections and movable independently of each other toward and from the adjacent fixed clutch section, a gear wheel on the driven shaft, a clutch section feathered on the driven shaft and movable between the other fixed clutch section and the gear wheel to alternately connect the driving and the driven shafts direct or to connect the gear wheel with the driven shaft, a counter shaft journaled parallel with the shafts, a fixed gear on the counter shaft meshing with the gear on the driven shaft, a fixed gear on the counter shaft for each of the gears of the series on the driving shaft, each gear of the series being moved into register with the corresponding gear of the counter shaft when the said gear is moved into engagement with the fixed clutch section, an idler gear for connecting one of the gears of the series to the adjacent gear on the counter shaft, the other gears of the series meshing directly with the gears of the counter shaft, means for moving each of the last-named gears of the series, means for moving the clutch section on the driven shaft, and a common means for moving the idler into register and into mesh with the adjacent gear on the counter shaft and for moving the gear of the series adjacent thereto into engagement with the fixed clutch section and into register with the gear on the counter shaft.

3. In a variable speed gearing, alined driving and driven shafts, a counter shaft journaled parallel therewith, a normally inoperative driving connection between the counter shaft and the driven shaft, a normally inoperative direct connection between the driving and the driven shafts, a common means movable between the said connections for alternately controlling the said connections, a fixed clutch section on the driving shaft, a series of gear wheels loose on the driving shaft and movable toward and from the clutch section to connect the gear wheels with the driving shaft, a fixed gear wheel on the counter shaft adjacent to each gear of the series, and in position to register with the gear when the gear is moved into engagement with the fixed clutch section, an idler between one of the gears of the series and the adjacent gear on the counter shaft; the other gears of the series meshing directly with the respective gears of the counter shaft, the idler being movable into and out of mesh with the gear of the counter shaft, and a common means for first moving the idler into mesh with the gear of the counter shaft, and for afterward moving the gear and the idler into register with the said gear on the counter shaft.

4. In a variable speed gearing, alined driving and driven shafts, a counter shaft journaled parallel therewith, a normally inoperative driving connection between the counter shaft and the driven shaft, a normally inoperative direct connection between the driving and the driven shafts, a common means movable between the said connections for alternately controlling the said connections, a fixed clutch section on the driving shaft, a series of gear wheels loose on the driving shaft and movable toward and from the clutch section to connect the gear wheels with the driving shaft, a fixed gear wheel on the counter shaft adjacent to each gear of the series, and in position to register with the gear when the gear is moved into engagement with the fixed clutch section, an idler between one of the gears of the series and the adjacent gear on the counter shaft, the other gears of the series meshing directly with the respective gears of the counter shaft.

5. In a variable speed gearing, a driving and a driven shaft, a counter shaft, normally inoperative connection between the counter shaft and the driven shaft, a normally inoperative direct connection between the driving shaft and the driven shaft, means movable between the said connections for alternately controlling the same, a series of normally inoperative connections between the driving shaft and the driven shaft, a normally inoperative reversing connection between the driving shaft and the driven shaft, a bar mounted to slide longitudinally of the said shafts for operating the first-named controlling means, a bar movable longitudinally of the shafts for operating each of the last-named connections, each bar having guided movement and having a transverse opening, and a cam plate movable through the opening of each bar for moving the said bar in opposite directions.

6. In a variable speed gearing, a driving and a driven shaft, a counter shaft, a normally inoperative connection between the counter shaft and the driven shaft, a normally inoperative direct connection between the driving shaft and the driven shaft, means movable between the said connections for alternately controlling the same, a series of normally inoperative connections between the driving shaft and the driven shaft, a normally inoperative reversing connection between the driving shaft and the driven shaft, a bar mounted to slide longitudinally of the said shafts for operating the first-named controlling means, a bar movable longitudinally of the shafts for operating each of the last-named connections, each bar having guided movement and having a transverse opening, a cam plate movable through the opening of each bar for moving the said bar in opposite directions, an independent means for moving each cam plate, and means controlled by the movement of each of the said means for positively locking all of the other of the said means from movement until the first-named means has been returned to normal neutral position.

7. In a variable speed connection, the combination with the series of longitudinally movable slides for shifting the several gear and clutch connections, each slide having a transverse opening and a cam for each slide movable through the opening for shifting the slides in opposite directions, an independent means for moving each cam, means in connection with each of the said moving means for locking the said means with the cam in operative position, and means controlled by the movement of each of the said moving means for the cams for positively locking all of the other of the said means from movement until the first-named means has been returned to normal neutral position.

8. In a variable speed connection, the combination with the series of longitudinally movable slides for shifting the several gear and clutch connections, each slide having a transverse opening and a cam for each slide movable through the opening for shifting the slide in opposite directions, an independent means for moving each cam, and means controlled by the movement of each of the said moving means for the cams for positively locking all of the other of the said means from movement until the first-named means has been returned to normal neutral position, the moving means comprising a cylindrical casing, a disk for each cam mounted to rotate in the casing, said casing having a slot at each disk, a headed pin connected with each disk and extending through the slot, a sleeve mounted to slide on the pin, a spring pressing the sleeve toward the casing, locking lugs at the end of each slot for engagement by the sleeve to hold the disk with the cam in operative position, a connection between each disk and one of the cams, each disk having a radial slot and a pointed cam forming the rear wall of each slot, a series of locking blades mounted to slide longitudinally of the casing, and engaging the radial slots of the disks, springs pressing the blades toward each other, said blades being adapted to be separated by the pointed cams to move them outwardly into the recesses of the other disks.

9. In a variable speed connection, the combination with the series of longitudinally movable slides for shifting the several gear and clutch connections, each slide having a transverse opening and a cam for each slide movable through the opening for shifting the slide in opposite directions, an independent means for moving each cam, and means controlled by the movement of each of the said moving means for the cams for positively locking all of the other of the said means from movement until the first-named means has been returned to normal neutral position.

10. In a variable speed connection, the combination with the series of longitudinally movable cams for shifting the several gear and clutch connections, of means for moving each cam vertically, means in connection with each of the said moving means for locking the said moving means with the cam in operative position, and means controlled by the movement of each of the said means for positively locking all of the other of the said means from moving until the first-named means has been returned to normal neutral position.

11. In a variable speed connection, the combination with the series of longitudinally movable cams for shifting the several gear and clutch connections, of means for moving each cam longitudinally, and means controlled by the movement of each of the said moving means for positively locking all of the other of the said means from moving until the first-named means has been returned to normal neutral position.

12. In a variable speed connection, the combination with the series of longitudinally movable slides for shifting the several gear and clutch connections, said means comprising a substantially cylindrical casing, a disk for each cam mounted to rotate in the casing, said disks being coaxial, a link connecting each disk with the cam to move the cam longitudinally when the disk is oscillated, said casing having a peripheral slot at each disk, a pin connected with each disk and extending radially therefrom through the adjacent slot, locking means in connection with each pin for locking the disk with the cam in operative position, and means controlled by the movement of each of the said disks for positively locking all of the other disks from movement until the first-named disk has been returned to normal neutral position, said means comprising a series of locking blades, each disk having a radial notch or recess for engagement by a blade, said blades having guided movement in the casing longitudinally thereof, springs normally pressing the blades together and holding them at the center of the casing, each disk having a pointed cam forming the rear wall of the radial recess for passing between adjacent blades and moving them longitudinally of the casing in opposite directions to positively lock the other disks from movement, the springs holding the locking blades with the pointed cams at the junction between the blades.

13. In a variable speed connection, the combination with the series of longitudinally movable slides for shifting the several gear and clutch connections, said means comprising a substantially cylindrical casing, a disk for each cam mounted to rotate in the casing, said disks being coaxial, a link connecting each disk with the cam to move the cam longitudinally when the disk is oscillated, said casing having a peripheral slot at each disk, a pin connected with each disk and extending radially therefrom through the adjacent slot, locking means in connection with each pin for locking the disk with the cam in operative position, and means controlled by the movement of each of the said disks for positively locking all of the other disks from movement until the first-named disk has been returned to normal neutral position.

14. In a variable speed connection, the combination with the series of longitudinally movable cams for shifting the several gear and clutch connections, of means for operating the cams, said means comprising a series of coaxial rotatable disks, each disk being connected with the cam and each disk having means for rotating the same, and for holding the disk with the cam in operative position, and locking means controlled by the movement of any disk for positively locking the other disks from rotation until the first-named disk has been returned to normal neutral position, said last-named means comprising blades having guided sliding movement longitudinally of the casing, each disk having a radial notch or recess for engagement by the blades, and said recesses registering when the cams are in neutral position, each disk having a pointed cam for engaging between adjacent blades to move the blades into the locking recesses of the other disks, and springs normally holding said blades with the abutting edges of the disks in alinement with the pointed cams.

15. In a variable speed connection, the combination with the series of longitudinally movable cams for shifting the several gear and clutch connections, of means for operating the cams, said means comprising a series of coaxial rotatable disks, each disk being connected with the cam and each disk having means for rotating the same, and for holding the disk with the cam in operative position, and locking means controlled by the movement of any disk for positively locking the other disks from rotation until the first-named disk has been returned to normal neutral position.

16. In a variable speed connection, the combination with the series of longitudinally movable cams for shifting the several gear and clutch connections, of means for operating the cams, said means comprising a series of coaxial rotatable disks, each disk being connected with the cam and each disk having means for rotating the same, and locking means controlled by the movement of any disk for positively locking the other disks from rotation until the first-named disk has been returned to normal neutral position.

17. In a variable speed connection, the combination with gear and clutch mechanisms and a series of longitudinally movable cams arranged alongside each other for shifting the several gear and clutch connections, of means for operating the same and comprising a series of coaxial rotatable disks, each disk being connected with a longitudinally movable means and each disk having means for rotating the same, and locking means controlling the movement of any disk for positively locking the other disks from rotation and controlled by the movement of the said disk.

JAMES W. CAMPBELL.

Witnesses:
C. H. STODDARD,
H. H. HICE.